United States Patent [19]
Sekiya et al.

[11] Patent Number: 5,990,666
[45] Date of Patent: Nov. 23, 1999

[54] CHARGING GENERATOR HAVING A SHORT PROTECTION CIRCUIT

[75] Inventors: Noritaka Sekiya, Hitachinaka; Naoyuki Takahashi, Mito; Syouju Masumoto, Hitachiota, all of Japan

[73] Assignees: Hitachi, Ltd.; Hitachi Car Engineering Co., Ltd., both of Japan

[21] Appl. No.: 09/095,698

[22] Filed: Jun. 11, 1998

[30] Foreign Application Priority Data

Jun. 11, 1997 [JP] Japan ................................ 9-153272

[51] Int. Cl.⁶ .................................................. H02J 7/00
[52] U.S. Cl. .......................................... 320/162; 322/28
[58] Field of Search ............................. 320/162; 322/28, 322/22, 25, 33; 318/139; 307/10.1

[56] References Cited

U.S. PATENT DOCUMENTS

| | | | |
|---|---|---|---|
| 5,444,354 | 8/1995 | Takahashi et al. | 320/162 |
| 5,448,154 | 9/1995 | Kanke et al. | 322/28 |
| 5,617,011 | 4/1997 | Hammer et al. | 322/28 |
| 5,841,266 | 11/1998 | Hikita et al. | 322/33 |

FOREIGN PATENT DOCUMENTS 6-276695  9/1994  Japan .

*Primary Examiner*—Peter S. Wong
*Assistant Examiner*—K. Shin
*Attorney, Agent, or Firm*—Evenson, McKeown, Edwards & Lenahan, P.L.L.C.

[57] ABSTRACT

A short protection circuit is provided to periodically supply a reset pulse, turns on an electric power element only during the period of the reset pulse, and decide the presence and absence of a short circuit under the condition that the electric power transistor is forced to turn off when a field coil is short-circuited. In this short portection circuit, while the field coil is short-circuit, the reset pulse cycle is reduced, and hence the number of times the resetting is made per unit time is reduced, thus preventing the electric power element from generating excessive heat when the field coil is short-circuited.

5 Claims, 2 Drawing Sheets

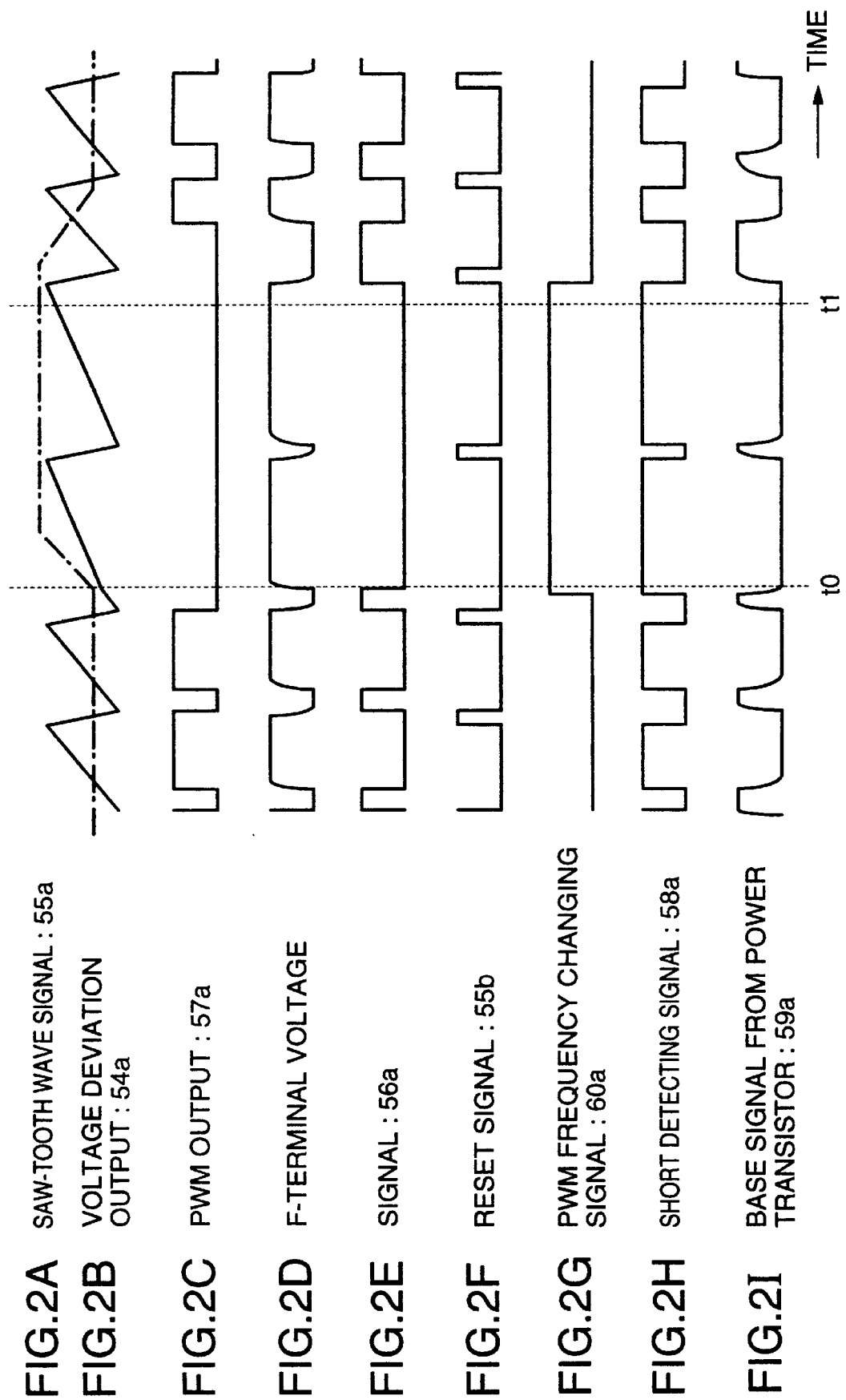

CHARGING GENERATOR HAVING A SHORT PROTECTION CIRCUIT

BACKGROUND OF THE INVENTION

The present invention relate s to cont rollers for charging generators, and particularly to a control device for a charging generator having a protection circuit suitable for the control device that is installed in vehicles and has a radio noise reducing circuit such as a soft switching circuit for reducing radio noise, and for protecting a electric power element for controlling a field current from being broken down when the field coil of the generator is short-circuited by some cause so that a battery voltage is supplied directly to the electric power element.

There is known a short protection device that is designed to protect the field current control electric power element from being broken down when the field coil is short-circuited as disclosed in, for example, JP-A-6-276695.

The protection device of this kind has a short protection circuit which decides that the field coil is short-circuited when the voltage at the junction between the field coil and the electric power element is equal to the battery voltage, making the electric power element nonconductive. In this case, a PWM (Pulse Width Modulation) output for controlling the electric power element has a fixed frequency and a variable duty, so that the electric power element can be switched from the conductive state to the nonconductive state in a short constant period of time. Thus, even when the electric power element is in the short-circuited state during that short period of time, it can be made conductive by the PWM output, and the short-circuit detection circuit can be reset.

SUMMARY OF THE INVENTION

When the prior art is applied to the controller having the soft switching circuit added to slow down the switching speed of the electric power element and reduce the switching noise, which is proposed in Japanese Patent Application No. 8-337982 assigned to the same assignee of the present application (corresponding to U.S. patent application Ser. No. 08/989,237 filed on Dec. 12, 1997 and German Patent Application No. 19755653.1 filed on Dec. 15, 1997), the reset pulse to the soft switch is delayed so that the electric power element generates too much heat to neglect when the field coil is short-circuited. Thus, it is necessary to improve the cooling structure.

It is an object of the invention to provide a control device for a charging generator which has a simple construction even in a form of a voltage control with a soft switching circuit added, and can present the electric power element from generating excessive heat.

According to the invention, there is provided a control device for a charging generator having a short protection circuit which forces the electric power element for controlling the current to the field coil to be turned off when the field coil for alternate output is short-circuited, and which periodically supplies a reset pulse to the electric power element so that the electric power element is turned on only during the period of the reset pulse, deciding the presence or absence of the short-circuited state, wherein while the field coil is short-circuited, the reset pulse cycle is reduced so that the number of times the electric power element is reset per unit time is reduced.

According to another aspect of the invention, there is provided a control device for a charging generator having a field coil for alternate output, an armature coil for generating output current by receiving the magnetic field from the field coil, a battery to be charged through a rectifier by the output current from the armature coil, a voltage deviation circuit for producing a output deviation between the voltage of the battery and a predetermined standard voltage, a current detect circuit for detecting the current in the electric power element for controlling the current in the field coil, a standard frequency generation circuit for generating the standard frequency of the voltage control, and a comparator for comparing the output from the standard frequency generation circuit and the output deviation signal, whereby the electric power element is controlled on the basis of the output from the comparator so that the battery voltage can be kept constant. In this case, the output frequency from the standard frequency generation circuit is changed to a lower value than an initial set value when the current detect circuit output exceeds a certain value.

In an embodiment of the invention, the standard frequency generation circuit is a sawtooth wave signal circuit which changes the frequency of the sawtooth wave signal when the current detect circuit exceeds a certain value.

In another embodiment of the invention, the standard frequency generation circuit has a reset pulse generation circuit which produces a reset pulse only when the electric potential of the sawtooth wave signal decreases, and the electric power element is made non-conductive by a feedback current from a capacitor during the period in which the electric potential of the sawtooth wave signal increases and exceeds a set value of the current detect circuit.

In another embodiment of the invention, the sawtooth wave signal circuit has a switch for changing the charging current to the capacitor.

BRIEF DESCRIPTION OF THE DRAWINGS

FIGS. 2A–2I are operating voltage waveform diagrams in the circuits shown in FIG. 1.

DESCRIPTION OF THE PREFERRED EMBODIMENTS

Figure 1:
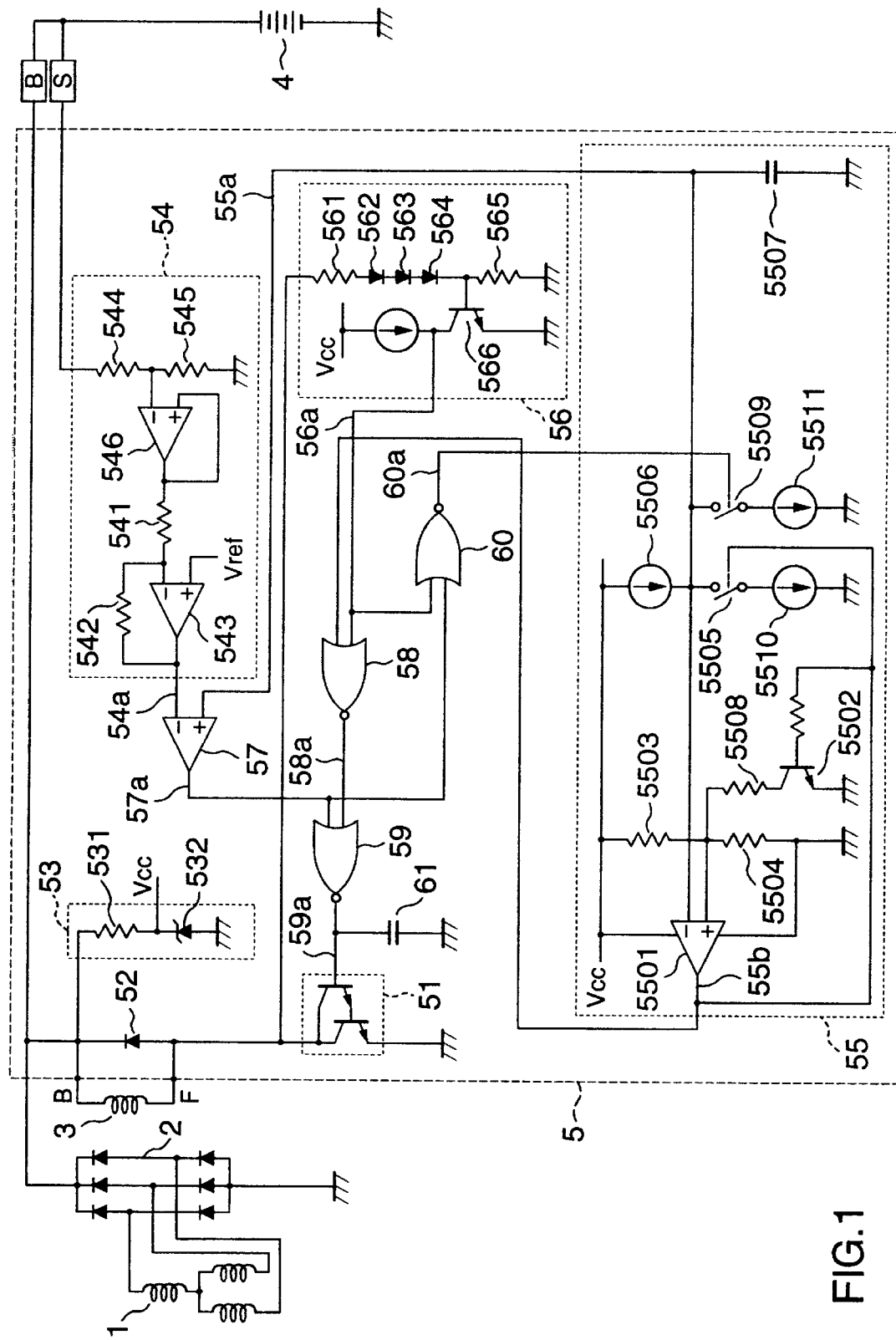
FIG. 1 is a circuit diagram of a control device for vehicle-purpose charging generator according to an embodiment of the invention.

An embodiment of the invention will be described with reference to the drawings.

FIG. 1 shows the whole construction of the control device for a vehicle-purpose charging generator. The charging generator is composed of an armature coil 1 connected by delta wiring, a three-phase full-wave rectifier 2 connected to the output end of the armature coil 1 so as to rectify AC output into a DC, a field coil 3 for supplying magnetic flux to the armature coil 1, and a voltage control 5 for controlling the charged voltage of a battery 4 to be constant.

The voltage control 5 is formed of a electric power element 51 (power transistor) for controlling the field current, a flywheel diode 52, a power supply circuit 53, a voltage deviation circuit 54, a standard frequency generation circuit (sawtooth wave signal circuit) 55, a current detect circuit 56 for detecting the current flowing in the power transistor, a comparator 57 for comparing the output from the voltage deviation circuit 54 and the output from the standard frequency generation circuit 55, NOR circuits 58, 59, 60 responsive to the standard frequency generation circuit (sawtooth wave signal generation circuit) 55 and comparator 57, and a capacitor 61 for delaying the base voltage of the power transistor.

The operation of each circuit block will be described. The voltage deviation circuit 54 includes an inverting amplifier having resistors 541, 542 and an amplification circuit 543, and produces an deviation voltage between a predetermined standard voltage Vref and a voltage VS1 into which the battery voltage is divided by resistors 544, 545. An amplifier circuit 546 included in the voltage deviation circuit is a buffer amplifier having an amplification factor of 1.

The voltage VC1 as an output 54a from the voltage deviation circuit 54 can be expressed by the following equation.

$$VC1 = Vref - \{(VS1 - Vref) \times R542\}/R541$$

In the sawtooth wave signal circuit 55, when the output from Ea comparator 5501 is a low level, a transistor 5502 s nonconductive, and the minus input to the comparator 5501 is a value VH into which the VCC is divided by resistors 5503, 5504. At this time, the plus input to the comparator 5501 is gradually increased in electric potential as a result of the fact that a capacitor 5507 is charged by a constant current source 5506 since a switch 5505 is in the off-state. When the plus input voltage to the comparator 5501 exceeds the minus input voltage, the output from the comparator 5501 is changed from the low level to the high level.

When the output from the comparator 5501 is changed to the high level, the minus input voltage becomes a value VL into which the VCC is divided by the resistors 5503, 5504 and a parallel resistor 5508 since the transistor 5502 is conductive. At this time, the plus input to the comparator 5501 is gradually decreased since the switch 5505 is turned on, allowing the current from the constant current source 5506 to flow through the switch 5505 into a constant current source 5510 and also the charge on the capacitor 5507 to be discharged through the switch 5505 into the constant current source 5510. When the plus input voltage to the comparator 5501 is reduced to less than the minus input voltage, the output from the comparator 5501 is changed from the high level to the low level.

By the repetition of the above operations, it is possible to generate a sawtooth wave signal at the plus input terminal 55a of the comparator 57. In addition, the output terminal 55b of the comparator 5501 becomes at the high level only when the capacitor 5507 is discharged. The upper and lower limit voltages VH, VL of the sawtooth wave signal, and the charging time T1, and discharging time T2 of the capacitor can be expressed as follows.

$$VH = \{R5504/(R5504+R5503)\} \times VCC$$

$$VL = \{RX/(RX+R5503)\} \times VCC$$

$$RX = (R5504 \times R5508)/(R5504+R5508)$$

$$T1 = \{C5507 \times (VH-VL)\}/i5506$$

$$T2 = \{C5507 \times (VH-VL)\}/(i5510-i5506)$$

The power transistor state detection circuit 56 as the current detect circuit is provided between the earth and the collector of the power transistor 51. When the power Transistor 51 is nonconductive, and when the field coil 3 is short-circuited, the voltage at a terminal F shown becomes the battery voltage, and current flows through a resistor 561, diodes 562, 563, 564 and a resistor 565, turning a transistor 566 on. When the power transistor 51 is conductive, the voltage at the terminal F becomes substantially zero, and thus no current flows through the resistor 561, diodes 562, 563, 564 and resistor 565, permitting the transistor 566 to be nonconductive so that the output 56a is the high level.

The plus input to the comparator 57 is the sawtooth wave signal 55a, and the minus input to the comparator is the output 54a from the voltage deviation circuit 54. The comparator output 57a is the PWM output of a fixed frequency.

The operation of the NOR circuits 58, 59 will be described below. The NOR circuits each produces the high level when the two inputs are the low level, and the low level when the inputs are other states. In other words, when the input 58a to the NOR circuit 59 is the low level, the power transistor 51 is permitted to be driven by the signal of the PWM output 57a (when the PWM output 57a is the low level, the power transistor 51 is conductive, and when the output 57a is the high level, the power transistor is nonconductive). When the input 58a to the NOR circuit 59 is the high level, the operation of the power transistor is prohibited (the power transistor 51 is made nonconductive independently of the state of the PWM output 57a).

The NOR circuit 58 receives the high-level output 55b (reset pulse) produced while the electric potential of the sawtooth wave signal is decreasing, and the output 56a from the power transistor state detection circuit 56. Thus, when the voltage at the terminal F is higher than a predetermined value while the electric potential of the sawtooth wave signal is increasing, the output 58a from the NOR circuit 58 becomes the high level, and under the other states it becomes the low level.

Therefore, the NOR circuits 58, 59 operate to make the power transistor 51 nonconductive irrespective of the PWM output 57a when the voltage at the terminal F reaches the battery voltage while the electric potential of the sawtooth wave signal is increasing.

The capacitor 61 acts to slow down the base voltage operation of the power transistor 51 and hence the switching speed of the power transistor 51.

The NOR circuit 60 receives the output 56a from the power transistor state detection circuit 56 and the PWM output 57a. When both the outputs 56a, 57a are the low level, the NOR circuit 60 produces the high level. In other words, when the field coil 3 is short-circuited, the NOR circuit 60 produces the high level, turning on the switch 5509 of the frequency conversion circuit 55. When the switch 5509 is turned on, the constant current source 5511 becomes conductive, thus shunting the current flowing from the constant current source 5506 to the capacitor 5507 so that the time required to charge the capacitor 5507 is prolonged.

Here, the charging time (time period required for changing) T1 and discharging time (time period required for discharging) T2 of the capacitor can be expressed by the following equations.

$$T1 = \{C5507 \times (VH-VL)\}/(i5506-i5511)$$

$$T2 = \{C5507 \times (VH-VL)\}/\{(i5510+i5511)-i5506\}$$

The conditions of the constant currents are set as i5510>i5511, i5506<(i5510+i5511).

That is, when the field coil 3 is short-circuited, the charging time T1 of the capacitor is extended, and thus the frequency of the reset pulse is reduced.

FIGS. 2A–2I show voltage waveforms of signals in which the field coil 3 is shorted-circuited at time t0 and released from the short-circuit at time t1. FIG. 2C shows the waveform of the PWM output 57a which results from comparing the sawtooth wave signal 55a of FIG. 2A and the voltage deviation circuit output 54a of FIG. 2B by the comparator 57. Thus, until time t0, the duty factor of the PWM output 57a is determined so that the battery voltage can reach a predetermined voltage (for example, 14.4 V).

When the field coil 3 is short-circuited at time t0, the field current cannot be supplied to the field coil 3, and thus the charging generator cannot generate electricity so that the battery voltage is reduced to less than a set voltage. The electric potential of the voltage deviation circuit output 54a shown in FIG. 2B suddenly increases, and the duty factor of the PWM output 57a of FIG. 2C is 100%. When the short-circuit is removed at time t1, the field current is supplied to the field coil 3, and thus the charging generator starts to generate electricity so that the battery voltage can reach the set voltage.

However, if the power transistor 51 becomes conductive under the short-circuited state of the field coil 3, a short-circuit current will flow from the collector to the emitter, breaking down the transistor with the result that the charging generator is disabled from generating electricity. Therefore, when the reset pulse 55b of FIG. 2F is in the low-level region (the electric potential of the sawtooth wave signal 55a is increasing), and when the terminal-F voltage of FIG. 2D has reached the battery voltage, the short-circuit detection signal 58a of FIG. 2H is made the high level by means of NOR circuits 58, 59 so that the power transistor 51 becomes nonconductive irrespective of the PWM output 57a. Thus, when the field coil 3 is short-circuited, the power transistor 51 can be prevented from being broken down. In addition, the short protection signal 58a of FIG. 2H becomes the low level during the short time (the discharging time T1 of the capacitor) after the electric potential of the sawtooth wave signal 55a is changed to decrease by the reset pulse 55b of FIG. 2F, and thus if the PWM output 57a of FIG. 2C is the low level, the power transistor 51 will become conductive. In other words, since the duty factor of the PWM output of FIG. 2C is 100% under the condition that the field coil 3 is short-circuited as described above, the short-circuit current flows from the collector to emitter of the power transistor 51 during the short time in which the reset pulse 55b of FIG. 2F is the high level.

Here, the NOR circuit 60, in the short-circuit mode, produces the PWM frequency changing signal 60a of FIG. 2G. When the signal 60a is the high level, the switch 5509 is turned on, and thus the capacitor starts to be discharged through the constant current source 5510. When the constant current source 5511 operates, the time taken to charge the capacitor 5507 is extended, and as a result the PWM frequency is reduced.

The reduction of the PWM frequency corresponds to the reduction of the reset pulse frequency. This frequency reduction decreases the number of times the reset pulse occurs per unit time, making it possible to prevent the power transistor 51 from generating excessive heat even if the power transistor 51 makes the soft switching operation through the base-emitter path and the capacitor 61.

When the field coil 3 is released from the short-circuit at time t1, and then the reset pulse 55b of FIG. 2F becomes the high level just after the release from the short-circuit, the duty factor of the PWM output 57a of FIG. 2C is 100%, and thus the power transistor 51 becomes conductive. At this time, the F-terminal voltage of FIG. 2D becomes near to 0 V, and the short-circuit detection signal 58a of FIG. 2H becomes the low level. Accordingly, the power transistor 51 is controlled by the PWM output 57a of FIG. 2C, and the PWM frequency changing signal 60a of FIG. 2G becomes the low level, so that the PWM frequency returns to the original state.

In addition, even if the electric power element is changed from the conductive state to the non-conductive state by the PWM output 57a of FIG. 2C under the normal power generation so that the F-terminal voltage is the battery voltage and that a short-circuit condition is decided, the power transistor 51 is made conductive by the PWM output of FIG. 2C during the time in which the reset pulse 55b of FIG. 2F is the next high level. Therefore, the short-circuit state can be released, and the power transistor 51 can be controlled by the PWM output.

According to the embodiment of the invention, even if the field coil is unexpectedly short-circuited and if the electric power element is forced to turn off, the reset pulse is periodically supplied to the electric power element, turning it on only during the time in which h the reset t pulse is supplied so th at the short circuit is decided to be present or absent by the short protection circuit. While the field coil is short-circuited, the reset pulse cycle is reduced, and hence the number of times the resetting is made per unit time is reduced, thus making it possible to prevent the electric power element from generating excessive heat when the field coil is short-circuited.

In t he control device with the soft switching circuit added to slow down the switching speed of the electric power element in order to reduce the switching noise of the electric power element, the reset pulse to be fed to the baie of the electric power element is also slowed down, and thus it is difficult to shorten the time of the reset pulse. Therefore, it is very effective to reduce the reset pulse cycle, thereby preventing the electric power element from generating excessive heat.

Accordingly, the control device for preventing the electric power element from generating excessive heat can be constructed by simple circuits.

According to the invention, even in the voltage control with the soft switching circuit added in order to reduce the switching noise by slowing down the switching speed of the electric power element, it is possible to prevent the electric power element from generating excessive heat by using a simple structure.

We claim:

1. A control device for a charging generator comprising a short protection circuit for periodically supplying a reset pulse to an electric power element, turning on said electric power element only during the period of said reset pulse to decide the presence or absence of a short circuit under the condition that said electric power element for controlling a current to a field coil is forced to turn off when said field coil for alternate output is short-circuited, wherein during the period in which said field coil is short-circuited, the reset pulse cycle is reduced, and hence the number of times the resetting is made is decreased.

2. A control device for a charging generator comprising:
   a field coil for alternate output;
   an armature coil which receives a magnetic field from said field coil and generates an output current;
   a battery which is charged by said output current from said armature coil through a rectifier;
   a voltage deviation circuit for producing an output deviation between the voltage of said battery and a preset standard voltage;
   a current detect circuit for detecting a current in an electric power element for controlling said current to said filed coil;
   a standard frequency generation circuit for generating a standard frequency of a voltage control; and
   a comparator for comparing the output from said standard frequency generation circuit and said output deviation signal, wherein said electric power element is controlled by the output from said comparator, keeping said battery voltage constant, and the output frequency from said standard frequency generation circuit is changed to be low as compared with an initially set value when said current detect circuit exceeds a set value.

3. A control device according to claim 2, wherein said standard frequency generation circuit is a sawtooth wave signal circuit, and changes the frequency of a sawtooth wave signal when said current detect circuit exceeds said set value.

4. A control device according to claim 3, wherein said standard frequency generation circuit has a reset pulse generation circuit for producing a signal only when the electric potential of said sawtooth wave signal is falling off, and said electric power element is made nonconductive by a feedback current from a capacitor while the electric potential of said sawtooth wave signal is rising up and exceeds said preset value of said current detect circuit.

5. A control device according to claim 3, wherein said sawtooth wave signal circuit has a switch for changing a charging current to said capacitor.

* * * * *